US011580262B2

United States Patent
Lu et al.

(10) Patent No.: US 11,580,262 B2
(45) Date of Patent: *Feb. 14, 2023

(54) DATA MASKING IN A MICROSERVICE ARCHITECTURE

(71) Applicant: EMC IP Holding Company LLC, Hopkinton, MA (US)

(72) Inventors: Kimberly R. Lu, Sunnyvale, CA (US); Joseph S. Brandt, Salt Lake City, UT (US); Philip N. Shilane, Newtown, PA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,116

(22) Filed: Jun. 2, 2022

(65) Prior Publication Data

US 2022/0292219 A1  Sep. 15, 2022

Related U.S. Application Data

(63) Continuation of application No. 16/879,111, filed on May 20, 2020, now Pat. No. 11,475,160.

(51) Int. Cl.
*G06F 12/00* (2006.01)
*G06F 21/62* (2013.01)
(Continued)

(52) U.S. Cl.
CPC ...... *G06F 21/6254* (2013.01); *G06F 11/1453* (2013.01); *G06F 11/1469* (2013.01); *G06F 16/215* (2019.01); *G06F 2201/84* (2013.01)

(58) Field of Classification Search
CPC .............. G06F 21/6254; G06F 16/215; G06F 11/1453; G06F 11/1469; G06F 2201/84; G06F 3/0638; G06F 3/064; G06F 3/0641
See application file for complete search history.

(56) References Cited

U.S. PATENT DOCUMENTS 11,055,674 B1   7/2021  Hart
11,468,193 B2  10/2022  Lu et al.
(Continued)

FOREIGN PATENT DOCUMENTS

CN        110046509 A    7/2019
WO     2019/008548 A1    1/2019
WO     2020/177579 A1    9/2020

OTHER PUBLICATIONS

Goel et al., "Reactive Microservices in Commodity Resources," 2019 IEEE International Conference on Big Data (Big Data), pp. 3658-3665. (Year: 2019).

(Continued)

*Primary Examiner* — Shawn X Gu
(74) *Attorney, Agent, or Firm* — Workman Nydegger

(57) ABSTRACT

A method includes retrieving an object from storage and copying the object, generating a list that identifies one or more byte ranges, of the copy of the object, to be masked, providing the list to a masker controller microservice that examines a recipe corresponding to the copy of the object, where the recipe references a slice of the copy of the object, and the slice includes one or more data segments, masking, by the masker controller microservice, a segment of the slice that is in one of the byte ranges, to create a masked segment, and replacing, in the slice, the segment with the masked segment, to create a masked slice and creating a masked object recipe that contains a reference to the masked slice, creating a masked object that includes the masked slice, and that references any unmasked segments of the slice, and deduplicating the masked object.

10 Claims, 5 Drawing Sheets

(51) Int. Cl.
  *G06F 16/215*  (2019.01)
  *G06F 11/14*  (2006.01)

(56) References Cited

U.S. PATENT DOCUMENTS

| | | |
|---|---|---|
| 2015/0127621 A1 | 5/2015 | Kuo |
| 2016/0306560 A1 | 10/2016 | Maranna et al. |
| 2017/0019253 A1 | 1/2017 | Baptist et al. |
| 2017/0061155 A1 | 3/2017 | Gordon et al. |
| 2018/0181495 A1 | 6/2018 | Sala et al. |
| 2018/0188971 A1* | 7/2018 | Palangappa ........... G06F 3/0679 |
| 2019/0057218 A1 | 2/2019 | Bhaskara et al. |
| 2019/0087835 A1 | 3/2019 | Schwed et al. |
| 2019/0245918 A1 | 8/2019 | Xu et al. |
| 2020/0042214 A1 | 2/2020 | Chen et al. |

OTHER PUBLICATIONS

International Preliminary Reporton Patentability received for PCT Patent Application No. PCT/US2021/28958, dated Dec. 1, 2022, 8 pages.

* cited by examiner

DATA MASKING IN A MICROSERVICE ARCHITECTURE

RELATED APPLICATIONS

This application is related to the following applications: U.S. patent application Ser. No. 16/879,077, entitled DATA MASKING IN A MICROSERVICE ARCHITECTURE; U.S. patent application Ser. No. 16/879,084, entitled DATA MASKING IN A MICROSERVICE ARCHITECTURE; and, U.S. patent application Ser. No. 16/879,096, entitled DATA MASKING IN A MICROSERVICE ARCHITECTURE. All of the aforementioned applications are incorporated herein in their respective entireties by this reference.

FIELD OF THE INVENTION

Embodiments of the present invention generally relate to data masking. More particularly, at least some embodiments of the invention relate to systems, hardware, software, computer-readable media, and methods for the use of microservices to perform data masking in a scalable architecture.

BACKGROUND

Data masking is an important feature that enables companies to have complete trust, while still maintaining usefulness in their backup environment. Data masking can take place on many different aspects of data such as specific entries in databases, to emails from specific employees. Examples of sensitive data that an enterprise may wish to mask include Social Security numbers, credit card numbers, and private financial details. In addition to the masking, it may also be useful to retain a backup copy of the original data in its unchanged form. However, while there are a number of different methods for data masking that exist today, implementation of data masking in a microservice deduplication environment would introduce complexities that conventional approaches are not well suited to address, if at all.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
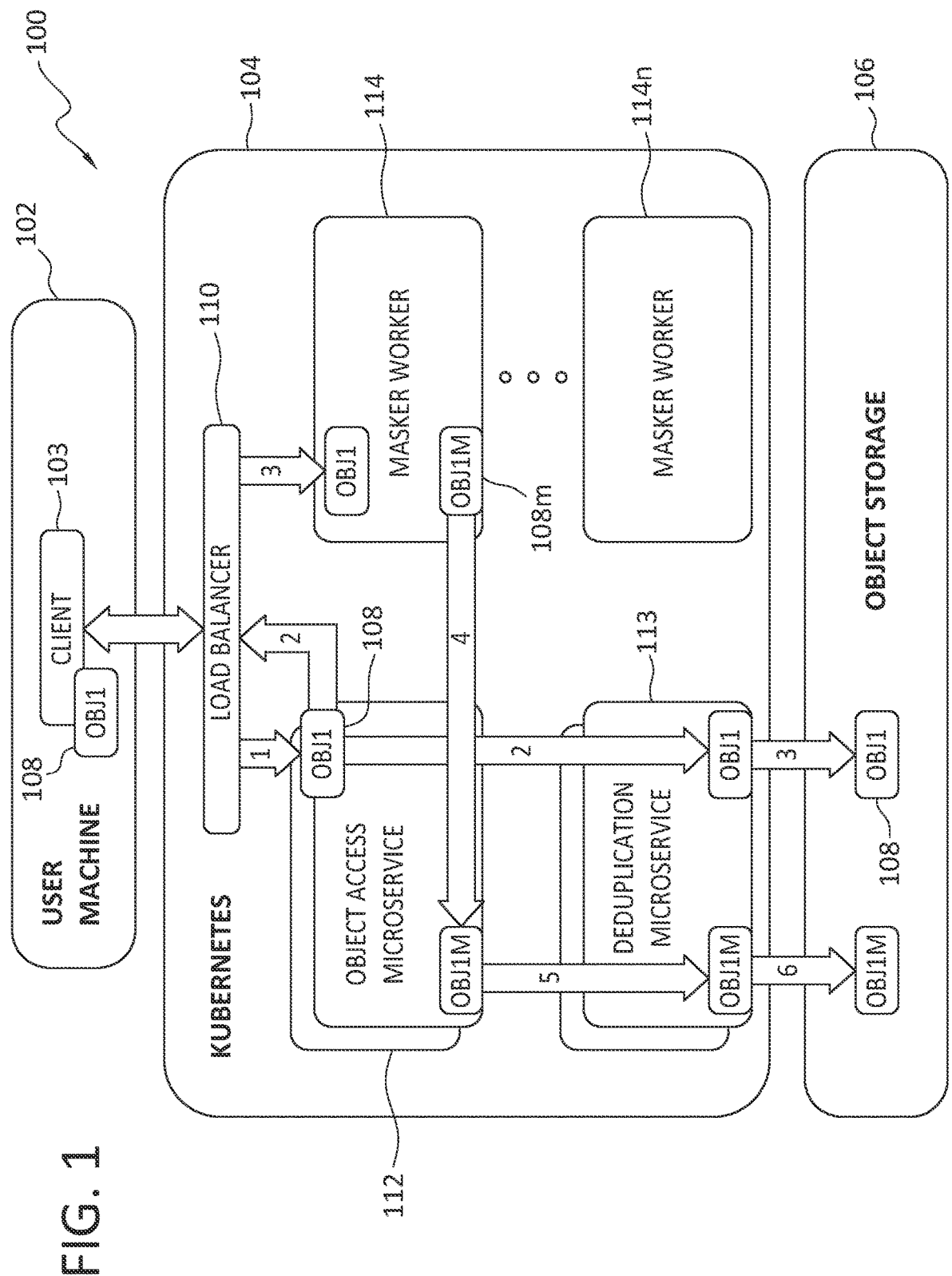
FIG. 1 discloses aspects of an example data masking architecture and workflow for inline computations using an internal load balancer.

Embodiments of the present invention generally relate to data backup and restore processes. More particularly, at least some embodiments of the invention relate to systems, hardware, software, computer-readable media, and methods for the use of microservices to perform data masking in a scalable architecture.

Data masking is an important feature in a number of storage products to avoid the leakage of confidential information to unauthorized accesses. Conventional data masking tasks have been implemented in a standard coding style in a single process space. In contrast, some example embodiments of the invention embrace an architecture with a microservice design that scales based on demand with masker controller and masker worker microservices.

Example embodiments may implement masking in various modes, such as inline, and offline using a job approach. To the extent possible, embodiments of the invention may avoid recalculation of fingerprints in either of these modes. Embodiments may be particularly useful in data deduplication domains, such as deduplicated object storage in a cloud environment, although no particular environment is required for embodiments of the invention. Thus, while reference may be made herein to performance of masking processes in connection with customer data ingested, and stored in some instances, at a datacenter, such reference to customer data and a datacenter is by way of illustration only and is not intended to limit the scope of this disclosure or the scope of the claims.

Embodiments of the invention may enable performance of masking data by general algorithms built into a system, and/or by client facing hooks personalized for a particular data set. The example approaches disclosed herein may be flexible enough to allow for either method to take place, and may involve one or more embodiments of an architecture to apply data masking to client data efficiently.

If a customer wants specific data masked in a specific way, the customer may simply provide the functionality for manipulating that particular data. In an embodiment, the customer may also choose to use one of the general built-in methods, such as identifying and masking Social Security numbers or credit card numbers.

In some embodiments, both the original customer objects as well as masked customer objects are stored. Based on criteria such as user credentials, for example, a user may have access to either the original objects or the objects to which masking has been applied. Some example embodiments may provide the option to only store the masked objects.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that provision is made for performing masking inline as customer data is ingested at a datacenter for example, and/or performing masking offline after the customer data has already been ingested and stored. In some embodiments, computational efficiency may be achieved by the re-use, rather than recalculation, of hashes as circumstances permit. In some embodiments, varying levels of efficiency may be implemented as needed so that, in some case, masking may be performed at an object level, while in other cases, masking may be performed in a more granular fashion, such as with respect to a byte range rather than with respect to an entire object. In related embodiments, byte range and object level masking may be performed together with respect to a data stream, or stored data. An inline masking process may involve masking one or more portions of an incoming data stream before those portions are stored.

A. Aspects of Example Architectures and Environments

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data masking operations. Operations related to masking operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Dell-EMC cloud environments, Microsoft Azure, Amazon AWS, and Google Cloud. More generally however, the scope of the invention is not limited to employment of any particular type or implementation of cloud storage.

In addition to the storage environment, the operating environment may also include one or more clients, or users, that are capable of collecting, modifying, and creating data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

At least some particular embodiments may be implemented, for example, in connection with a Kubernetes environment, which comprises an open-source container-orchestration system for automating application deployment, scaling, and management. Such containers may also be referred to herein as pods. However, it is not required that a Kubernetes environment be employed with embodiments of the invention. As well, embodiments of the invention may, but do not necessarily, involve the processing of data, such as client or user data for example, that is ingested into, stored at, and/or restored from, a data storage site such as a datacenter for example.

It is further noted that as used herein, 'masking' is intended to be interpreted broadly. As such, masking embraces, but is not limited to, the obscuring, transforming, and/or replacing of selected data so that the selected data is not accessible to unauthorized entities. To illustrate with a simple example, part or all of a social security number of a user may be removed thus XXX-XX-1234, or replaced in its entirety with 'XXX-XX-XXXX,' while other data in the associated data string may be preserved without modification. A similar approach may be taken with regard to any personal information and/or other information that is required to be maintained in confidence. An administrator, for example, may have access to the unmodified data string, while other users may only have access to the data string with the masking. In some embodiments, in addition to the modified, or masked, data string, the unmodified data string may also be preserved, while in other embodiments, only the masked data string is preserved and the original data string is deleted.

Finally, it is noted with respect to the disclosed processes that any process or portion thereof may be performed in response to, and/or as a result of, the performance of any preceding process(es). Thus, performance of one or more processes may be a predicate to subsequent performance of one or more additional processes.

Advantageously, selective masking may enable confidential information to be made inaccessible, while access to other needed information is preserved. For example, a useful statistical analysis of medical records may require access to information about specific medical conditions. Analysis of the records may be usefully performed without, for example, the names of the patients involved. Thus, masking patient names may preserve confidentiality, while still allowing for access to the medical data.

Following is a discussion of some particular example embodiments. Note that while the titles of the following example embodiments may refer to particular attributes of a masking process, such reference is for the purposes of facilitating the present discussion and is not intended to limit the scope of applicability of any embodiment.

A.1 Inline Masking of New Data

With reference now to FIG. 1, details are provided concerning an example architecture 100 and associated processes which may be performed inline as new client data is ingested at a datacenter. As discussed below, FIG. 1 is concerned with a data masking architecture and workflow for inline computations using an internal load balancer. As shown in FIG. 1, and discussed below, a normal data ingestion process may be performed in which customer data such as the OBJ1 is ingested, deduplicated, and then stored. At the same time, a masking process may be performed with respect to the incoming data stream.

In general, the example architecture 100 may include one or more user machines 102 that host a client 103, such as an application for example, and the client 103 communicates with a container orchestration system 104, such as a Kubernetes environment for example, that may implement masking and other functionality with respect to client 103 generated data. The data generated by the user machines 102 may be stored in, and restored from, a storage environment such as object storage 106. In some embodiments, the container orchestration system 104 and the storage environment 106 may both be elements of a datacenter, such as a cloud datacenter for example, although that is not necessarily required.

As shown in FIG. 1, the user machine 102 may generate data 108, which may comprise one or more objects, such 'OBJ1.' The data 108 may be communicated to an internal cluster load balancer, or simply load balancer, 110 that operates to facilitate the transfer of data into, out of, and between microservices. In general, the load balancer 110 may operate to, among other things, apportion a masking workload associated with the incoming client data stream among one or more entities that perform masking operations, one example of which is a masker worker.

The load balancer 110 may then upload the data 108 to one or more object access microservices 112, as shown at (1). Rather than splitting the data 108 into slices, the object access microservice 112 may check to determine if data masking is enabled. If so, the object access microservice 112 may copy the data 108 and send the copy of the data 108 to the load balancer 110, as shown at (2). At, or about, the same time, the object access microservice 112 may also forward (2) the original data 108 to a deduplication microservice 113 for deduplication prior to storage (3) of the data 108 in the object storage 106. Prior to, at about the same time as, or subsequent to, storage of the deduplicated data 108, or at another time, the load balancer 110 may forward (3) the copy of the data 108 to an available masking pod 114, referred to in FIG. 1 as a 'masker worker.' In some particular embodiments, masking of the object OBJ1 copy by the masking pod 114 may be performed before the original object OBJ1 is stored in object storage 106. Note that an 'available' masking pod may be a pod that is not currently performing masking operations, as well as a pod that is performing masking operations and which may be associated with a queue of one or more masking jobs.

As indicated, there may be any number 'n' of masking pods 114, and the number of masking pods 114 employed for any given process or dataset may be scaled up or down, automatically, based on the masking workload. One alternative option may be to start a Kubernetes job to mask stored data 108 in order to allow for zero scaling of the masking pods 114, which would require zero resources when not actually masking. The original uploaded data 108 may continue to be processed and stored.

To continue with the example of FIG. 1, the masker worker microservice 114 may then perform an appropriate masking algorithm on the data 108, such that the data 108, that is, OBJ1, received at the masker worker 114 is transformed by the masker worker 114 to the masked object OBJ1M, or data 108*m*. When masking is complete, the masker worker 114 may then forward the masked data 108*m* back to the load balancer 110 which may then forward the masked data 108*m* to an available object access microservice 112. Alternatively, the masker worker 114 may bypass the load balancer 110 and forward (4) the masked data 108*m* directly to an available object access microservice 112. The object access microservice 112 may then forward (5) the masked data 108*m* to the deduplication microservice 113 for deduplication prior to storage (6) in the object storage 106. In some embodiments, any of the deduplication processes disclosed herein may be performed on a segment-by-segment basis. More generally, any such deduplication process can be performed on any basis with a finer granularity than an object basis. Finally, and as noted elsewhere herein, deduplication may be performed at the object level in some embodiments.

In the example of FIG. 1 then, an object OBJ1 may be retained in its unmasked form, and in its masked form OBJ1M. Either or both forms may be accessible, or inaccessible, to one or more parties based upon various criteria which may be defined by a user, administrator, or other entity. It is noted that the masked form of the object may be handled in a variety of ways, one of which is to name the masked object in such a way that the name indicates the object has been masked, such as the 'OBJ1M' notation referred to above. In some embodiments, the customer may have the option to name the object in such a way as to indicate the masked nature of the object. Additionally, or alternatively, the customer may specify that the masked version of the object is written to a particular bucket designated by the user. Creation and naming of that bucket may be performed at the direction of the user.

Because the masked data 108m has changed relative to the data 108, it may be necessary to calculate and store a fingerprint, such as a hash for example, of the object OBJ1M. As well, because the object OBJ1M may be new, due to the fact that it is a masked version of the object OBJ1, no deduplication of the masked data 108m may be needed, or possible, in some circumstances. On the other hand, the object OBJ1 may be a candidate for deduplication since it has not been modified by masking. It is noted that reference to a hash is made only by way of example. More generally, any process which operates on data to produce a unique identifier, or 'fingerprint,' based on, and corresponding to, that data, may be employed.

With continued attention to the example of FIG. 1, some additional points are noted. The processes of FIG. 1 may be performed inline, that is, as data 108 is being ingested into a storage environment. Thus, masking of the data 108 may be performed before the data 108 received from the client 103 is stored in the object storage 106. Moreover, the architecture 100 may additionally, or alternatively, be used to mask previously written, that is, stored, data that resides in the object storage 106. The masking of stored data may be referred to herein as 'offline' masking. That is, the example architecture 100 may be used to implement inline and/or offline data masking.

In order to apply masking to previous backups, that is, stored data, it may be necessary to read back the previously written data and send it back through the architecture 100 with the masking functionality turned on. However, this may be a relatively slow and inefficient process in some cases. Other example approaches to offline masking are disclosed elsewhere herein.

A.2 Offline Masking of Stored Data

Figure 2:
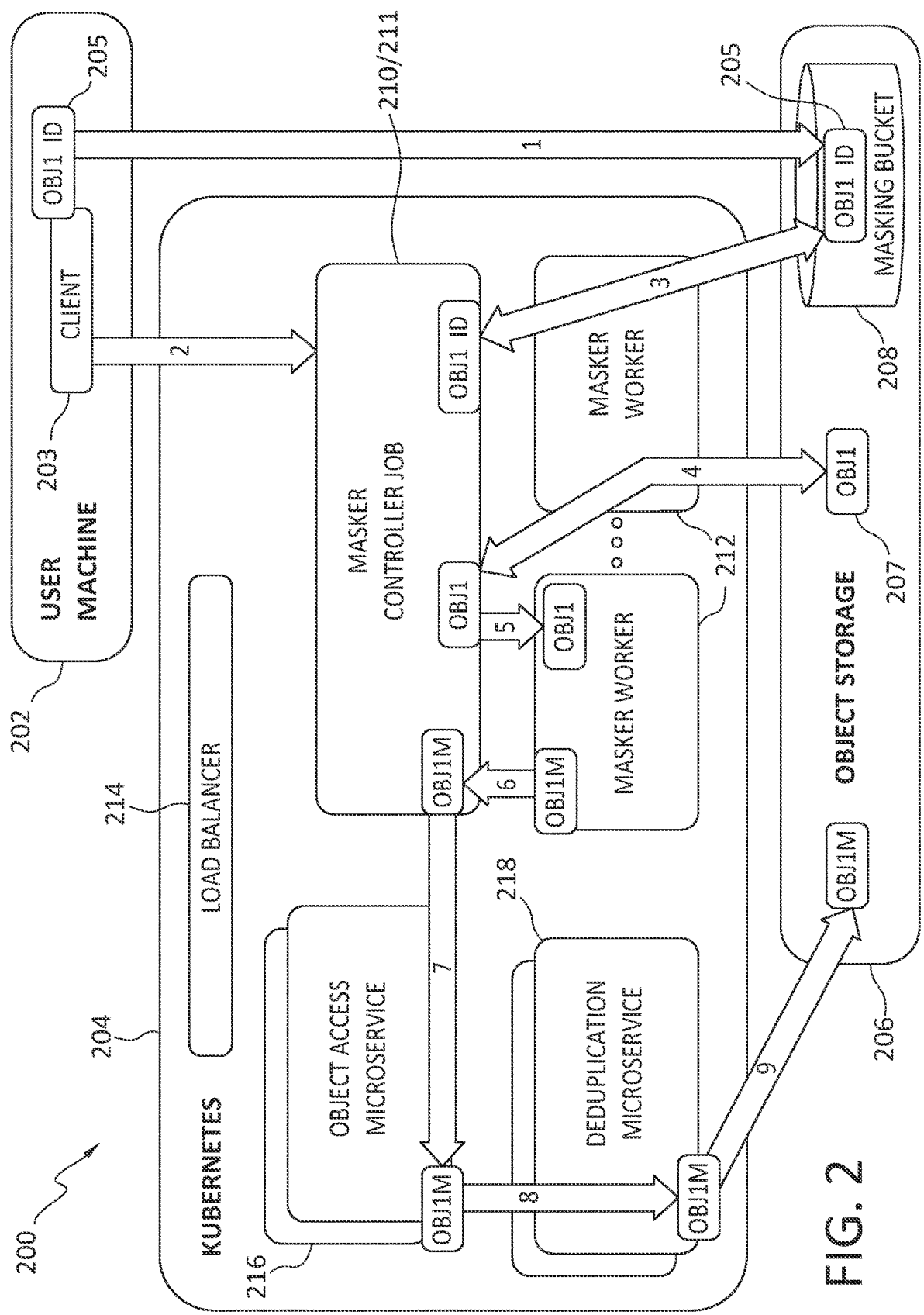
FIG. 2 discloses aspects of an example data masking architecture and workflow for offline computations using a masker controller microservice.

With reference next to FIG. 2, an example architecture 200 and associated processes are indicated. In general, FIG. 2 discloses a data masking architecture and workflow for offline computations using a masker controller microservice. More specifically, the architecture 200 and associated processes may enable implementation of the inline masking functionality disclosed in connection with FIG. 1, as well as enabling implementation of an alternative method for offline masking. In general, the approach exemplified in FIG. 2 involves the use of a job, such as a Kubernetes job for example, which may be started at any time and shuts down automatically upon completion.

As shown in FIG. 2, the example architecture 200 may include one or more user machines 202 that host a client 203, such as an application for example, and the client 203 communicates with a container orchestration system 204, such as a Kubernetes environment for example, that may implement masking and other functionality with respect to client 203 generated data. The client generated data may be identified by an appropriate object ID 205 such as OBJ1 ID for example. The data may be stored in, and restored from, a storage environment such as object storage 206. In some embodiments, the container orchestration system 204 and the storage environment 206 may both be elements of a datacenter, such as a cloud datacenter for example, although that is not necessarily required.

Initially, a user may select one or more objects 207, such as an object 207 OBJ1 identified by the object ID OBJ1 ID for example, and/or one or more object buckets with respect to which the user wants to implement masking. The object buckets, which may be defined at the object storage 206, may store one or more objects designated by the user as candidates for masking. This designation may be performed at data ingestion and/or after the data 205 has been stored at the object storage 206, and/or at any other time(s). The user selection of objects and/or masking buckets may be implemented by way of any suitable user interface (UI), examples of which include a graphical UI, and a command line interface (CLI). The UI may be presented, for example, at the user machine 202, although such UI may be presented at additional, or alternative, entities.

The list of object buckets and/or object names identified by the user are uploaded (1) to a cluster masking bucket 208 which, in some embodiments at least, is client-specific and accessible only by the specified client. In other embodiments, a masking bucket may be shared between/among two or more entities. The masking bucket 208 may be an element of the object storage 206. After this information has been uploaded, an offline masker controller job 210 may start (2) a masker controller pod 211, which may be referred to simply as a masker controller. The masker controller job may be manually triggered by a user, and/or may be set to run on any specified time interval, such as hourly, daily, or weekly, for example. The masker controller job 210 may use the object IDs (3), provided by a user to the masking bucket 208, to retrieve (4) from the object storage 206, the objects (e.g., OBJ1) to be masked. The masker controller job 210 and/or the object storage 206 may, prior to masking, create a copy of each object that is sent to the masker controller job 210, and these copies may be stored in the object storage 206. Alternatively, the masker controller job 210 may retrieve a copy of an object from the object storage 206, copy the retrieved object, and then return the retrieved object to object storage 206. The copy of the object is subsequently subjected to the masking process.

In some embodiments, one or more objects may be so large that copying them into memory, for example by the masker controller job 210 and/or the object storage 206 is impractical, or impossible. In such cases, one or more objects may be read in a streaming manner or basis, such as segment-by-segment for example, processed in memory, and the data is masked then streamed out, such as on a segment-by-segment basis for example, to the object access microservice 216.

After the objects have been retrieved (4), whether as whole objects or in a streaming fashion, the masker controller job 210 may then distribute (5) the retrieved objects amongst one or more masker workers 212. The functionality of the masker workers 212 may be similar, or identical, to the functionality of the masker pods 114 discussed herein in connection with FIG. 1. In more detail, the masker controller 211 may begin by reading out the object names from the cluster masking bucket 208 and placing the object names into a channel, or queue. The masker controller job 210 may then initiate multiple threads which retrieve an object name from the channel and then attempt to get the corresponding object (4) from the object storage 206. Next, the object may be forwarded (5) by the masker controller job 210 to a masker worker 212 either directly, or by way of an internal load balancer 214.

The masker worker 212 may then perform the appropriate masking on the object OBJ1 and return (6) the new masked object OBJ1M and the old object ID OBJ1 ID to the masker controller 211. The masker controller 211 may then forward (7) the new object OBJ1M to an object access microservice 216 either directly, or by way of the internal load balancer 214. When the masking has been successfully performed and the new, masked, object OBJ1M has been received (6) by the masker controller 211, the masker controller 211 may then delete (3) the original object ID from the cluster masking bucket 208. Any objects that were not successfully masked, whether due to an error or for some other reason, are logged and those objects and their object IDs remain in the cluster masking bucket 208.

With continued reference to the example of FIG. 2, the new object OBJ1M may be transmitted (8) by one of the object access microservices 216 to a deduplication microservice 218 for deduplication prior to storage in the object storage 206. As shown in FIG. 2, the original, unmasked, object OBJ1 may be retained in its unmasked form, and in its masked form OBJ1M. Either or both forms may be accessible, or inaccessible, to one or more parties based upon various criteria which may be defined by a user, administrator, or other entity.

Finally, because the new object OBJ1M has changed relative to the object OBJ1, it may be necessary to calculate and store a fingerprint, such as a hash for example, of the new object OJB1M, or at least hashes of the segments that have changed. As well, because the object OBJ1M may be new, due to the fact that it is a masked version of the object OBJ1, no deduplication of the new object OBJ1M may be needed, or possible, in some circumstances. On the other hand, the object OBJ1 may be a candidate for deduplication since it has not been modified by masking.

As suggested above, in at least some instances, an entire object may not be hashed, and only the changed segments of that object are hashed. This approach may be employed where, for example, the object is large and comprises many segments. In more detail, each changed segment of the object may be hashed thus creating a fingerprint that is a possible candidate for deduplication. Fingerprints that are new may result in the corresponding segments being stored. Metadata may be generated for OBJ1 and OBJ1M so they can be reconstructed from their stored segments. In such cases, the entire unmasked OBJ1 and masked object OBJ1M may not be stored in the object storage. Rather, there may be respective object recipes representing OBJ1 and OBJ1M that reference intermediate metadata, such as slice recipes, that include one or more fingerprints that reference corresponding segments. Those segments may be stored individually or in compression regions in object storage 206.

Thus, as indicated in the discussion of FIG. 2, embodiments of the invention may provide for the masking of stored data. The data may have been received and stored as part of a client data ingestion process at a datacenter, for example. Thus, if inline masking is not feasible for some reason, customer data may still be masked offline, that is, after that customer data has been received and stored.

Moreover, and as noted herein, the example architecture of FIG. 2 is configured to perform inline and/or offline masking of client data.

A.3 Optimized Approaches for Inline/Offline Processing and Computations

Figure 3:
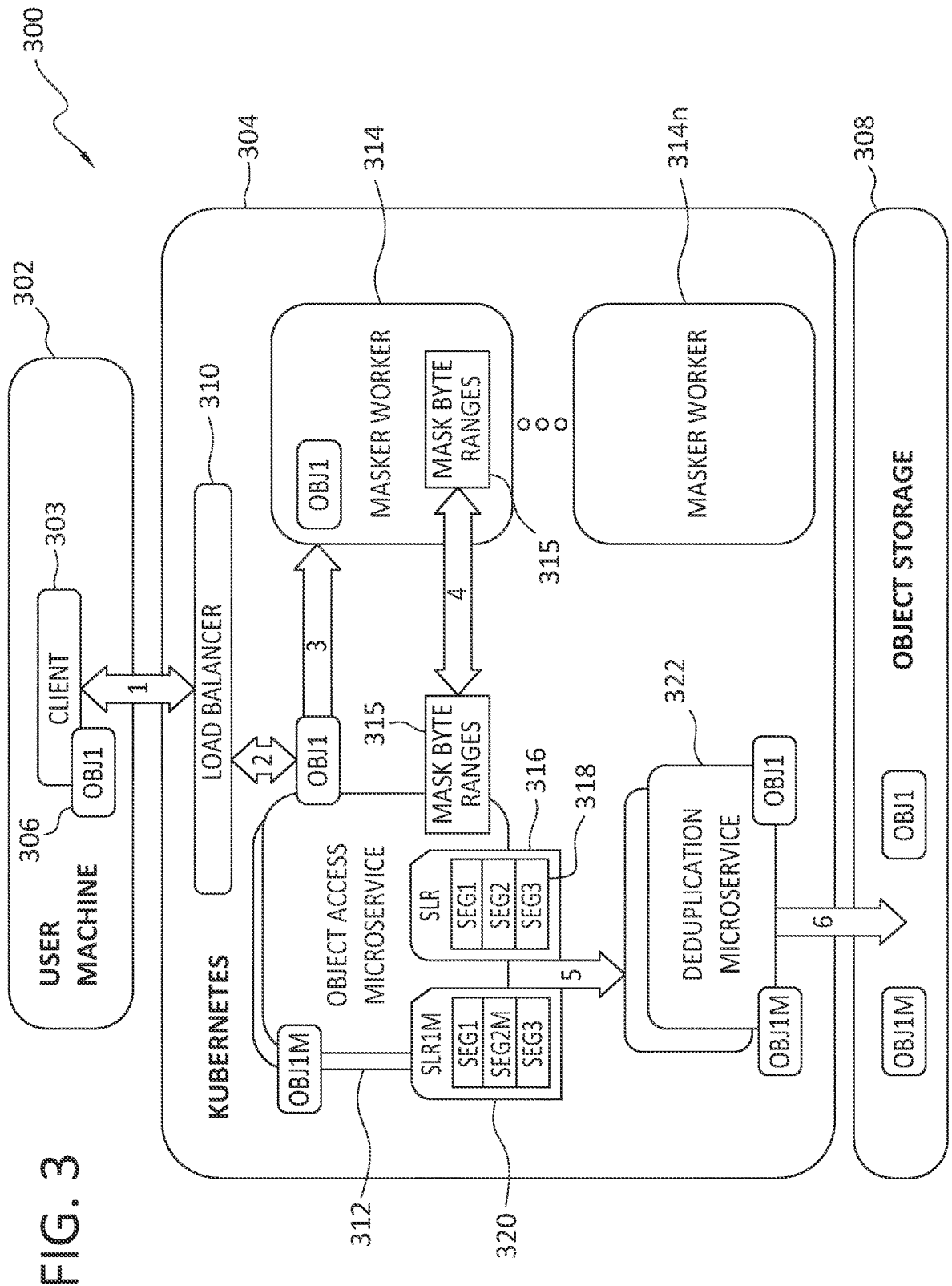
FIG. 3 discloses aspects of an optimized data masking architecture and workflow for inline processes and computations.
Figure 4:
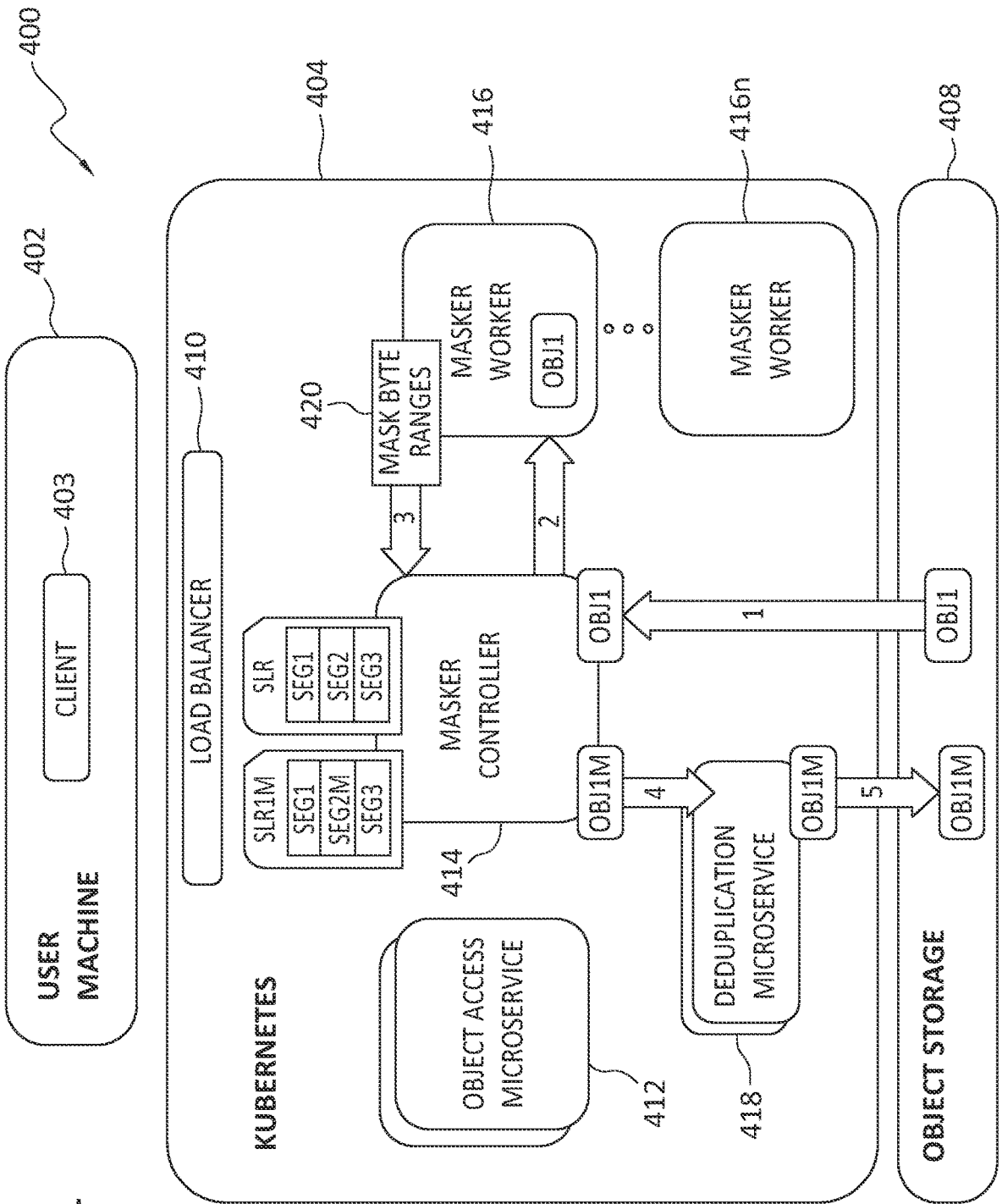
FIG. 4 discloses aspects of an optimized data masking architecture and workflow for offline processes and computations.

With reference now to FIGS. 3 and 4, details are provided concerning optimized data masking architectures and workflows for inline computations and masking (FIG. 3) and for offline computations and masking (FIG. 4). The respective approaches embodied in FIGS. 3 and 4 may provide for some efficiencies in terms of the calculation of fingerprints for masked and unmasked data. By way of introduction, and assuming data slices of a particular size such as ~8 MB, fingerprints may be calculated, such as by hashing each ~8 KB segment of data within a slice. In the embodiments of FIGS. 1 and 2, the fingerprints for the data objects may be calculated twice, that is, once for the segments of the original object and a second time for the segments of the masked object. On the other hand, in the embodiments of FIGS. 3 and 4, the double fingerprint calculation may be avoided in cases when segments do not contain masked data. The approaches of FIGS. 3 and 4 involve the generation of metadata for both the masked and original objects, while avoiding repeated fingerprint calculations. For example, a masked object according to FIG. 3 or 4 may include a combination of masked portions, such as segments, along with pointers to unmasked portions, such as segments, that reside in storage.

With particular reference now to FIG. 3, an architecture 300 is disclosed that may include one or more user machines 302 that host a client 303, such as an application for example, and the client 303 communicates with a container orchestration system 304, such as a Kubernetes environment for example, that may implement masking and other functionality with respect to client 303 generated data 306, such as the object OBJ1 for example. The client data 306 may be stored in, and restored from, a storage environment such as object storage 308. In some embodiments, the container orchestration system 304 and the storage environment 308 may both be elements of a datacenter, such as a cloud datacenter for example, although that is not necessarily required.

In the example of FIG. 3, and as discussed below, masking may be performed at a relatively finer level of granularity than in the example of FIG. 2. In particular, the example processes of FIG. 3 may enable masking at a byte range level, where the byte range, or byte ranges, consists of data that is a subset of an object. By way of contrast, the processes of FIG. 2 may be performed at an object level.

Initially, the client 303 may write (1) an object 306 which is directed (2) by an internal load balancer 310 to an object access microservice 312. In order to perform data masking on the object OBJ1, the object access microservice 312 may first check to determine whether data masking is enabled. If so, the object access microservice 312 sends (3) the object to a masker worker microservice 314 either directly, or by way of using the internal load balancer 310. The number 'n' of masker workers 314n performing masker worker microservices may scale up and down as needed based on the amount of work. The masker worker 314 may then examine the object OBJ1 to determine the location(s) where data masking needs to be applied. For example, the masker worker 314 may identify a byte range of the object that includes personal information such as a social security number. Thus, some embodiments provide that only the byte(s) in the specified byte range(s) are masked, while the remaining portions of the object that includes the byte range(s) are not masked.

Depending upon the embodiment, the masker worker 314 may receive input from another entity that informs the masker worker 314 which particular byte range(s) are to be masked, and the masker worker 314 may then locate those byte range(s) in the object(s). Additionally, or alternatively, the masker worker 314 may be configured to look for particular, specified, types of information, and then mask that information where it is found. In this latter case, the masker worker 314 may not be aware of particular byte ranges to search for.

Once the data masking location or locations in the object OBJ1 is/are identified, the masker worker 314 may then return (4) a list 315 of byte ranges that represent the bytes that need to be masked. Using this list of mask byte ranges, the object access microservice 312 may begin a deduplication process for OBJ1, while also efficiently creating a masked object OBJ1M.

In order to prepare the object OBJ1 for deduplication, the object access microservice 312 may begin by making an object recipe that comprises one or more slices 316, each of which may contain one or more segments 318 of data. The slices 316 and segments 318 may be any size. In some embodiments, the segments 318 are about 8 KB, while the slice 316 made up by those segments 318 may be about 8 MB.

The processing implemented by the object access microservice 312 may vary depending upon the circumstances. For example, in a scenario where a segment of data contains a mask byte range 315 identified by a masker worker 314, the object access microservice 312 may perform data masking on the bytes in that byte range 315 and may then create a new segment, such as SEG2M for example, with the masked data. This masked segment SEG2M may then be referenced by a slice 320, such as SLR1M, for the masked object. Meanwhile, and as discussed below, the object access microservice 312 may also create one or more segments, such as SEG1 and SEG3, for the object data that is not masked for the original object OBJ1.

Another processing scenario of the object access microservice 312 involves a segment of data that does not contain a mask byte range. For this situation, the object access microservice 312 forms a segment such as SEG1 and SEG3 of the unaltered data, as it normally would, and these segments are referenced by both the original object OBJ1 and the masked object OBJ1M. By employing this technique, the object access microservice 312 may efficiently store both the original object and the masked object, while avoiding duplicate segment creation and fingerprint calculation for segments that do not contain masked data.

With continued reference to FIG. 3, fingerprints of the segments of both the original object OBJ1 and the masked object OBJ1M may be transmitted (5) by the object access microservice 312 to a deduplication microservice 322 for deduplication, and any nonduplicate segments then transmitted (6) to the object storage 308. For example, as between the slices 316 and 320, the segments SEG1 and SEG3 may be candidates for deduplication since they have not changed, although segment SEG2M may not be a deduplication candidate, as it has been newly created by the object access microservice 312. Thus, the masked object OBJ1M may not exist as a complete object in the object storage 308. Instead, the masked object OBJ1M may be stored in the object storage 308 as a combination that includes a set of metadata concerning unmasked segments, and that also includes the masked segments.

With regard to deduplication, a deduplication microservice such as deduplication microservice 113 (FIG. 1), 218 (FIG. 2), or 322 (FIG. 3), may operate to identify duplicate segments. Thus, any duplicate segments that are identified do not have to have their fingerprints recalculated since respective fingerprints should already exist for those segments. In this way, the fingerprinting process may be omitted for segments that do not contain masked data.

Turning next to FIG. 4, an example architecture 400 and processes are disclosed for optimized offline data masking. In general, the architecture 400 may include one or more user machines 402 that host a client 403, such as an application for example. The user machine 402 may communicate with a container orchestration system 404, such as a Kubernetes environment for example, that may implement masking and other functionality with respect to client 403 generated data, where one example of such data is the object OBJ1. In the example of FIG. 4, the client 403 data has been ingested and retrievably stored in a storage environment, such as object storage 408. In some embodiments, the container orchestration system 404 and the storage environment 408 may both be elements of a datacenter, such as a cloud datacenter for example, although that is not necessarily required. Similar to the example of FIG. 3, the architecture 400 may further comprise a load balancer 410 and an object access microservice 412.

In contrast however, with the inline configuration in FIG. 3, the data flow in the example of FIG. 4 does not pass through the object access microservice 412. Instead, the offline data masking approach disclosed in FIG. 4 employs a masker controller microservice 414 that may communicate, and operate in connection, with 'n' masker workers 416 to 416*n*, and may also communicate with a deduplication microservice 418. In general, the use of a separate masker controller microservice 414 may allow for efficient data masking of stored objects, such as OBJ1 for example, without overloading the object access microservice 412.

As noted in the discussion of FIG. 2, the masker controller microservice 414 may be created by a Kubernetes job and then spun down once the job is complete. The masker controller microservice 414 may first read (1) an object OBJ1, for example, from object storage 408 based on the object IDs from a dedicated masking bucket (see, e.g., FIG. 2). The object OBJ1 may then be sent (2) to a masker worker 416 that implements a masker worker microservice. The number of masker workers 416 may scale up and down as needed based on the amount of work to be performed.

As the data to be masked, such as confidential data for example, may span segment and slice boundaries, the masker worker microservice performed by the masker worker 416 may analyze the object OBJ1 bytes without regard to boundaries, and may then return (3) a list 420 of mask byte ranges to the masker controller microservice 414. Using this list 420 of mask byte ranges, masker controller microservice may begin efficiently creating a masked object OBJ1M.

Particularly, the masker controller microservice 414 may start by iterating through the original object recipe that references one or more slices, such as slice SLR1, which contain segments of data, such as SEG1, SEG2, and SEG3. If a segment, such as SEG2 for example, contains confidential data based on the mask byte ranges in the list 420, the masker controller microservice 414 may replace that segment SEG2 with a new segment SEG2M that has masked data. However, if the segment, such as segments SEG1 and SEG3 for example, does not contain any data that needs to be masked, then the masked object OBJ1M may reference the original object segments SEG1 and SEG3. By employing this technique, the masker controller microservice 414 may efficiently store the masked object OJB1M by avoiding duplicate segment creation and fingerprint calculation for segments, such as the segments SEG1 and SEG3, that do not contain masked data.

That is, instead of the masked object OBJ1M including unmasked segments, the masked object instead references the unmasked segments in storage. Such a reference may take the form, for example, of a pointer. To illustrate, the masked object may include respective pointers that point to the locations for SEG1 and SEG3 in storage. In this way, replication of segments SEG1 and SEG3 in the masked object may be omitted. Thus, a masked object OBJ1M may contain a combination of masked segments, and pointers to unmasked segments.

With continued reference to FIG. 4, the newly created masked object may be transmitted (4) by the masker controller microservice 414 to the deduplication microservice 418 for deduplication prior to storage (5) in the object storage 408. For example, as between the slices SLR1M and SLR1, the segments SEG1 and SEG3 may be candidates for deduplication since they have not changed, although segment SEG2M may not be a deduplication candidate, as it has been newly created by the masker controller microservice 414.

B. Further Example Embodiments

Following are some further example embodiments of the invention. These are presented only by way of example and are not intended to limit the scope of the invention in any way.

Embodiment 1. A method, comprising: retrieving an object from storage and creating a copy of the object; by a masker worker, generating a list that identifies one or more byte ranges, of the copy of the object, to be masked; providing the list to a masker controller microservice; by the masker controller microservice, examining a recipe corresponding to the copy of the object, where the recipe references a slice of the copy of the object, and the slice includes one or more data segments; masking, by the masker controller microservice, a segment of the slice that is in one of the byte ranges, to create a masked segment, and replacing, in the slice, the segment with the masked segment, to create a masked slice and creating a masked object recipe that contains a reference to the masked slice; creating a masked object that includes the masked slice, and that references any unmasked segments of the slice; and deduplicating the masked object.

Embodiment 2. The method as recited in embodiment 1, wherein only masked segments of the slice are included in the masked object, and the masked object does not include any unmasked segments.

Embodiment 3. The method as recited in any of embodiments 1-2, wherein the masked object includes a reference to an unmasked segment in storage.

Embodiment 4. The method as recited in any of embodiments 1-3, wherein one of the byte ranges spans a segment boundary.

Embodiment 5. The method as recited in any of embodiments 1-4, wherein one of the byte ranges spans a slice boundary.

Embodiment 6. The method as recited in any of embodiments 1-5, wherein the masker worker receives the copy of the object from the masker controller microservice.

Embodiment 7. The method as recited in any of embodiments 1-6, wherein the masker controller microservice iteratively examines each slice in the recipe to identify byte range data.

Embodiment 8. The method as recited in any of embodiments 1-7, wherein retrieving an object from storage and creating a copy of the object are performed by the masker controller microservice.

Embodiment 9. The method as recited in any of embodiments 1-8, further comprising generating a fingerprint of the masked segment only, and not for any unmasked segments.

Embodiment 10. The method as recited in any of embodiments 1-9, further comprising storing the masked object in storage.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

C. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
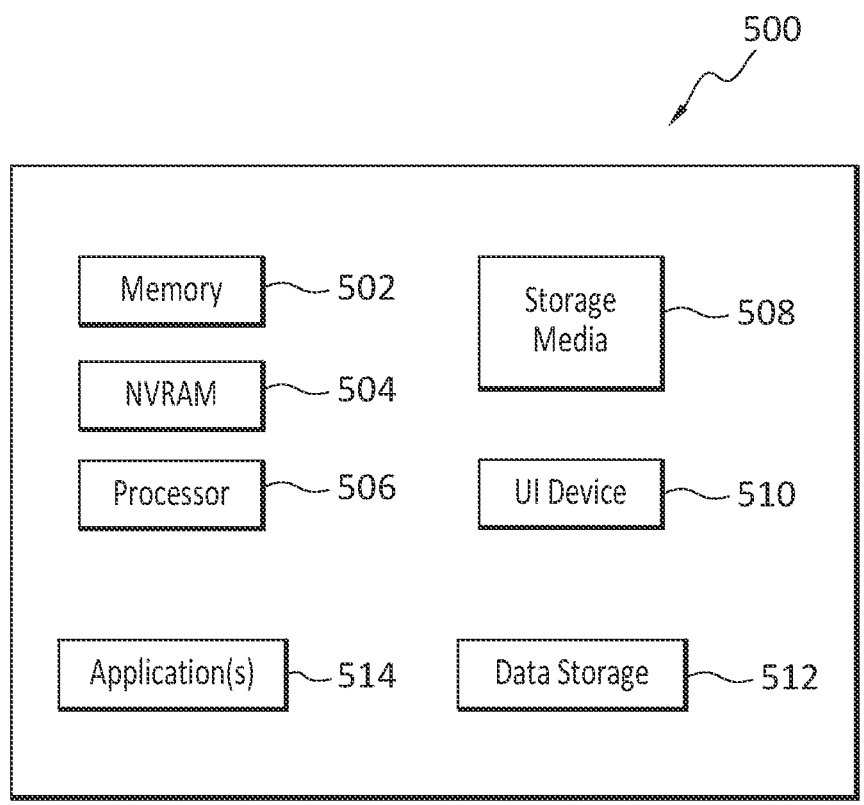
FIG. 5 discloses aspects of an example computing entity.

With reference briefly now to FIG. 5, any one or more of the entities disclosed, or implied, by FIGS. 1-5 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory such as non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 512 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
one or more hardware processors; and
a non-transitory storage medium having stored therein instructions that are executable by the one or more hardware processors to perform operations comprising:
retrieving an object from storage and creating a copy of the object;
by a masker worker, generating a list that identifies one or more byte ranges, of the copy of the object, to be masked;
providing the list to a masker controller microservice;
by the masker controller microservice, examining a recipe corresponding to the copy of the object, where the recipe references a slice of the copy of the object, and the slice includes one or more data segments;
masking, by the masker controller microservice, a segment of the slice that is in one of the one or more byte ranges, to create a masked segment, and replacing, in the slice, the segment with the masked segment, to create a masked slice;
creating a masked object that includes the masked slice, and that references any unmasked segments of the slice; and
deduplicating the masked object.

2. The system as recited in claim 1, wherein only masked segments of the slice are included in the masked object, and the masked object does not include any unmasked segments.

3. The system as recited in claim 1, wherein the masked object includes a reference to an unmasked segment in storage.

4. The system as recited in claim 1, wherein one of the one or more byte ranges spans a segment boundary.

5. The system as recited in claim 1, wherein one of the one or more byte ranges spans a slice boundary.

6. The system as recited in claim 1, wherein the masker worker receives the copy of the object from the masker controller microservice.

7. The system as recited in claim 1, wherein the masker controller microservice iteratively examines each slice in the recipe to identify byte range data.

8. The system as recited in claim 1, wherein retrieving an object from storage and creating a copy of the object are performed by the masker controller microservice.

9. The system as recited in claim 1, wherein the operations further comprise generating a fingerprint of the masked segment only, and not for any unmasked segments.

10. The system as recited in claim 1, wherein the operations further comprise storing the masked object in storage.

* * * * *